United States Patent
Mazur et al.

(10) Patent No.: US 6,600,758 B1
(45) Date of Patent: Jul. 29, 2003

(54) METHODS AND APPARATUS FOR MEASURING CONTROL CARRIER SIGNAL STRENGTH IN WIRELESS COMMUNICATIONS SYSTEMS EMPLOYING DISCONTINUOUS CONTROL CARRIER TRANSMISSIONS

(75) Inventors: Sara Mazur, Bromma (SE); Patrik Lundqvist, Cary, NC (US); Johan Molnö, Stockholm (SE); Christofer Lindheimer, Kista (SE)

(73) Assignee: Telefonaktiebolaget Lm Ericsson (publ), Stockholm (SE)

( * ) Notice: Subject to any disclaimer, the term of this patent is extended or adjusted under 35 U.S.C. 154(b) by 0 days.

(21) Appl. No.: 09/472,881

(22) Filed: Dec. 28, 1999

Related U.S. Application Data
(60) Provisional application No. 60/136,794, filed on May 28, 1999.

(51) Int. Cl.[7] .................................................. H04J 3/06
(52) U.S. Cl. ...................... 370/508; 370/350; 370/458; 455/434
(58) Field of Search .......................... 455/434; 370/336, 370/337, 345, 347, 350, 442, 458, 498, 503, 507, 508

(56) References Cited

U.S. PATENT DOCUMENTS
6,438,115 B1 * 8/2002 Mazur et al. ................ 370/337

FOREIGN PATENT DOCUMENTS
| EP | 0 444 841 | 9/1991 | ............ H04B/7/26 |
| EP | 0 886 453 | 12/1998 | ............ H04Q/7/38 |

OTHER PUBLICATIONS
Olofsson, H., et al., "Aspects of Introducing EDGE in Existing GSM Networks", International Conference on Universal Personal Communications, U.S., IEEE, New York, NY, Oct. 5, 1998, pps. 421–426, XP002104616.

ETSI TS 100 908 v.6.2.0 Digital Cellular Communication System (Phase 2+); "*Multiplexing and multiple access on the radio path*" (GSM 05.02 version 6.2.0 Release 1997).

* cited by examiner

Primary Examiner—William Trost
Assistant Examiner—Rafael Perez-Gutierrez

(57) ABSTRACT

A method and device for making measurements on a control channel carrier that is not transmitting continuously with constant power is disclosed. In a system transmitting control on, e.g., one timeslot and not keeping a constant power on the other timeslots, the invention makes sure that, e.g., a mobile station always opens its measurement window during the control channel timeslot. A measurement window is made significantly shorter than a timeslot duration.

10 Claims, 9 Drawing Sheets

FIG. 4

METHODS AND APPARATUS FOR MEASURING CONTROL CARRIER SIGNAL STRENGTH IN WIRELESS COMMUNICATIONS SYSTEMS EMPLOYING DISCONTINUOUS CONTROL CARRIER TRANSMISSIONS

CROSS-REFERENCE TO RELATED APPLICATIONS

The present application claims priority to U.S. Provisional Application No. 60/136,794, entitled "Measurement Method in a Communication System with Discontinuous Control Carrier" and filed May 28, 1999, which is incorporated herein in its entirety by reference.

FIELD OF THE INVENTION

The present invention generally relates to cellular and wireless communication. More specifically, the invention relates to a method for making neighbor cell measurements in a cellular communication system employing a discontinuous control channel carrier. The present invention also relates to mobile stations that perform such neighbor cell measurements.

BACKGROUND OF THE INVENTION

Recently, there has been a trend in the telecommunication community to focus more and more on wireless packet data communication rather than circuit switched voice communication. With the tremendous increase of Internet users, it is believed that the packet switched communication will soon increase more and become larger than the circuit switched voice communication that today dominates, e.g., the cellular communication. Cellular communication system manufacturers and operators are therefore looking for solutions to integrate their circuit switched services with wireless packet switched services that can provide reliable and more spectrum efficient connections for packet switched users, e.g., Internet users. This trend has made different types of packet switched communication system evolutions flourish. One of the more well known packet switched cellular systems in the telecommunications community, is the extension of the present Global System for Mobile Communication (GSM), known as General Packet Radio Service (GPRS).

GPRS is a packet switched system that uses the same physical carrier structure as the present GSM cellular communication system and is designed to coexist and provide the same coverage as GSM. The GPRS radio interface is thus based on a TDMA (Time Division Multiple Access) structured system with 200 kHz carriers divided into eight timeslots with GMSK (Gaussian Minimum Shift Keying) modulation. The multiplexing is such that each timeslot can typically serve a number of users. One user can also be allocated more than one timeslot to increase its throughput of data over the air.

The GPRS specification includes a number of different coding schemes to be used dependent on the quality of the radio carrier. With GPRS, data rates well over 100 kbps will be possible.

There is also ongoing a development and standardization of a new air interface mode in GSM, which will affect both packet and circuit switched modes. This new air interface mode is called EDGE, Enhanced data rates for global evolution. EDGE's main features are new modulation and coding schemes for both packet switched and circuit switched data communication. In addition to the Gaussian Minimum Shift Keying (GMSK) modulation, an 8 symbol Phase Shift Keying (8PSK) modulation is introduced. This modulation can provide users with higher bit rates than GMSK in good radio environments.

A new technique called link quality control is introduced with EDGE. Link quality control is a functionality that allows adaptation in terms of coding and modulation with respect to present signal quality. In poor radio conditions, a robust coding and GMSK modulation is selected whereas in good radio conditions, a less robust coding and 8PSK modulation is used. GPRS (and the extensions thereof) also provides a backward error correction functionality in that it can request retransmissions of erroneously received blocks. This mechanism is called ARQ (Automatic Repeat reQuest) and is well known in the art.

The packet data mode with EDGE modulation is called EGPRS (Enhanced GPRS) and the circuit switched data mode is called ECSD, Enhanced Circuit Switched Data. Bitrates over 384 kbps will be possible with EDGE.

Recent development for another TDMA based cellular system, the cellular communication system compliant to the ANSI/136 standard, below referred to as TDMA/136 has been focused on a packet data system to be integrated with the TDMA/136 circuit switched mode.

This packet data system will also be based on the new EDGE technology as defined for the GPRS extension. It will then allow TDMA/136 operators to provide bit rates up to 384 kbps on 200 kHz carriers with GMSK and 8PSK modulation as defined for EGPRS.

This integration of TDMA/136 and EDGE, does not, however, come without a cost. The TDMA/136 carriers have a bandwidth of only 30 kHz, to be compared with EDGE carriers of 200 kHz. This means that operators that want to introduce EDGE, have to allocate 200 kHz for each EDGE carrier or, to put it in another way, to free up spectrum for each EDGE carrier corresponding to 7 already existing 30 kHz carriers. Since operators already today are using these 30 kHz carriers for circuit switched communications, there is a large interest that the initial deployment for EDGE in TDMA/136 systems should be made on as small a spectrum as possible.

Reuse patterns are used in cellular systems, such that one can reuse the same frequencies in different cells. Systems are usually planned such that a number of cells share a number of available channels. For example, in a 4/12 frequency reuse, there are 12 different cells that share a set of frequencies. Within these 4/12 cells, no frequency is used in more than one cell simultaneously. (The number 4 in "4/12" denotes the number of base station sites involved in the 12 reuse. The 4/12 denotation thus indicates that a base station site serves 3 cells.) These 4/12 cells then form what is referred to as a cluster. Clusters are then repeated, to provide coverage in a certain area.

Similarly in a 1/3 reuse, there are 3 different cells that share a set of frequencies. Within these 3 cells, no frequency is used in more than one cell simultaneously. Thus, the higher the reuse, the better the carrier to interference ratio for an exemplary condition. For lower reuse patterns, interference is the carrier to interference ratio is lower, since the distance between two base stations transmitting on the same frequency is shorter. An exemplary 1/3 reuse is illustrated in FIG. 1.

GPRS channels typically have different levels of robustness depending on the type of logical channel being transmitted. A logical channel is defined by its information content and is transmitted on one or several physical channels, defined by the physical channel structure, e.g., a timeslot on a certain frequency. In a packet data system, reliance on retransmission possibilities can allow a quite high error rate which means that the reuse for user data traffic channels can be kept quite low. For example, a data traffic channel can be deployed in a 1/3 reuse whereas common control channels and broadcast channels are not robust enough to be allocated in a 1/3 reuse, since the same retransmission possibilities are not used for these types of logical channels. At least a 3/9 or even a 4/12 reuse is recommended for packet data common control and broadcast channels.

Note that a 3/9 reuse entails that at least nine 200 kHz carriers are needed (i.e., TDMA operators must provide at least 1.8 MHz of spectrum for an initial deployment). This is considered quite substantial in a TDMA system with 30 kHz carriers.

This fact has driven the TDMA community to find other solutions for initial deployment of a packet data system based on EDGE and GPRS. U.S. patent application Ser. No. 09/263,950, "High Speed Data Communication System and Method", to Mazur et al., hereby incorporated by reference, teaches a method of combining TDMA/136 and the EGPRS mode of EDGE.

Briefly, the solution is to put requirements on the base station transmissions of the EDGE carriers. Base station transmissions of EDGE carriers should be time synchronized. It is then possible to allocate the control channels on different frequencies and different timeslots in different cells and thereby construct a higher reuse than what is possible by only considering frequencies. This solution is often referred to as EDGE Compact. In addition to the frequency reuse, a time reuse is introduced. For example, a certain base station transmits control signalling on a certain timeslot at a certain time and on a certain frequency, at which no other base station in the same control channel cluster (i.e., all cells where each physical channel carrying control signalling is used once and only once) is transmitting anything at all. This is repeated between a number of base stations, such that different time groups are formed. Further, to increase reliability of control channel detection in the mobile stations and base stations respectively, timeslots adjacent to each other do not both carry control channel information.

EDGE Compact provides the opportunity to introduce a higher reuse than that allowed by frequency repetition only. Thus, it will be possible to allow an initial deployment of a GPRS/EGPRS packet data system within a spectrum bandwidth much smaller than that otherwise limited by the reuse requirement for the control channels. In FIG. 4, a typical allocation for the control channels is illustrated. Therein, four different time groups are illustrated on a single frequency, i.e., a 4x time reuse is formed. In one cell, control information is transmitted in timeslot 1, (TS 1), i.e., timegroup 1 (TG1), in certain GSM frames defined. Base stations transmitting control information on the same frequency but belonging to another time group, will not transmit at all during the frames that are used for control in base stations belonging to TG1. In another cell, control information is transmitted in TS3 (i.e., TG2), again in certain GSM frames. Base stations transmitting control information on the same frequency but belonging to another time group, will not transmit at all during the frames that are used for control in base stations belonging to time group 2. Similar reasoning applies for TS5 and TS7. Combining the time reuse with, e.g., a 1/3 frequency reuse, it is possible to transmit control information in an effective 4/12 reuse using only 3 frequencies. In FIG. 4, different types of control, information or logical control channels have been indicated. In block B0, broadcast information is transmitted on a logical Broadcast Channel (BCCH) and, e.g., in block C8 logical Common Control Channels (CCCH) are transmitted (e.g., paging messages). The structure of the control channel is such that more blocks than those indicated can be allocated for broadcast or control. For example, if one more block is needed for CCCH, this can be allocated in physical block 2, on GSM frames 8–11. Allocation of 2–12 blocks is possible on a single timeslot. One broadcast information block and one common control block is always needed.

Further, to be able to find this control channel, a frequency correction burst and a synchronization burst is included in each 52 multiframe. A mobile will first search for the frequency correction burst (located in GSM frame 25), and it will know that following this, there will be a synchronization burst 26 GSM frames later, on the same timeslot. This synchronization burst helps the mobile station identify the base station and learn where in the multiframe structure it is.

FIG. 3 illustrates an exemplary cell pattern that is formed of the reuse of time groups and frequencies combined. Note that in EDGE Compact, only the control channels are transmitted in the higher reuse, utilizing the time groups. The traffic channels are still transmitted in a 1/3 reuse.

EDGE Compact, will provide the possibility to deploy a packet data system in a spectrum well below the 1.8 MHz. In the example described, operators may deploy an EDGE Compact system with only three 200 kHz carriers.

As mentioned, the transmission of control information in EDGE Compact is different than the control channel transmissions in present GSM systems. Present GSM systems have at least one carrier in each cell that transmits continuously with constant power (i.e., it transmits on all timeslots, even if there is no traffic allocated). In present GSM systems, this continuous transmission serves as a beacon in the system, for mobiles to more easily find the control channel carrier, identify the cell and, e.g., make signal strength measurements for Mobile Assisted HandOver (MAHO) algorithms.

For MAHO, mobile stations report to the network how well they can hear neighbor cells, and what signal strengths they perceive. Then, based on those measurements, more reliable handovers are possible, as mobiles move between different cells.

In the EDGE Compact system, control channel signaling is only transmitted during one timeslot in each GSM frame. Signal strength measurements should be made on the control channel transmissions rather than on traffic channels, since traffic channels can be power controlled (i.e., transmitted with varying power). Thus, a mobile must know exactly in what timeslot it should measure on neighbor cells. This requirement has not existed with the earlier continuously transmitted control channel carriers.

Thus, a new strategy is needed for neighbor cell measurements in communication systems such as EDGE Compact. More specifically, there is a need for a technique which ensures that a mobile station measurement window opens when control channel signaling is actually transmitted from a neighbor.

SUMMARY OF THE INVENTION

In one aspect of the present invention, a method is provided for a mobile to make reliable signal strength measurements on neighbor cell control channel transmissions allocated on a carrier frequency that is not transmitting continuously.

This method contains the steps of defining a measurement window that does not extend longer in time than the shortest period at which a control channel transmission continuously extends in duration, for example a timeslot duration. The method further includes the step of opening a measurement window in the mobile at an appropriate time and closing the measurement window at an appropriate time, to ensure that the mobile actually measures on the control channel transmissions transmitted from base stations in neighbor cells. The appropriate time is calculated in the mobile station based on information as to which timeslot is used for control signalling from a certain neighbor base station, as well as information about the timeslot reference in the base station serving the mobile station.

In another aspect of the invention, a propagation delay estimate is performed in the mobile station, such that propagation delays from a neighbor cell base station are taken into consideration when a calculation of appropriate measurement times is performed.

In another aspect of the present invention, a measurement functionality is included in mobile stations so that each mobile station can calculate an appropriate measurement time based on input parameters including information about a timeslot reference in a serving cell and information as to which timeslot a neighbor base station uses to transmit control information.

In another aspect of the invention, a mobile also estimates a propagation delay to a neighbor base station and includes this as a parameter when calculating the appropriate time for measurements.

According to an exemplary embodiment, a base station site synchronized cellular communications system, wherein downlink control channel transmissions are allocated on discontinuous control channel carriers, includes a first base station, a neighboring base station, and a mobile station being served by the first base station. According to the embodiment, the mobile station includes a measurement unit which makes measurements of control channel signaling of the neighboring base station. Specifically, the measurement unit identifies a time slot during which the neighboring base station transmits control channel signaling, defines a duration of a control channel signaling measurement window to be less than a duration of the identified timeslot, and aligns the control channel signaling measurement window such that the measurements of the control channel signaling from the neighboring base station are made when the control channel signaling from the neighboring base station actually arrives at the measurement unit.

For example, the measurement unit can determine a position of a timeslot of the serving base station which corresponds with the identified timeslot of the neighboring base station, and then position the measurement window late in the timeslot of the serving base station. Alternatively, the measurement unit can determine a difference between a propagation delay from the serving base station and a propagation delay from the neighboring base station, and then adjust the position of the measurement window based on the determined difference. The mobile station can, for example, determine the difference between propagation delays by reading a synchronization burst of the neighboring base station.

According to other embodiments, the measurement unit can determine an absolute time reference of the serving base station, and then adjust the position of the measurement window based on the determined absolute time reference. Alternatively, the serving base station can transmit information regarding the relative geographic positions of the serving and neighboring base stations to the mobile station, and the measurement unit in the mobile station can adjust the position of the measurement window based on the transmitted information.

BRIEF DESCRIPTION OF THE DRAWINGS

These and other features, objects and advantages of the present invention will be readily apparent to those skilled in the art when reading the following detailed description, wherein references are made to the appended figures in which:

FIG. 4 illustrates a packet control channel allocation pattern in a 52 multiframe structure;

DETAILED DESCRIPTION OF THE INVENTION

The present invention is hereinafter described with reference to a GSM cellular communication system with the alterations introduced for EDGE Compact cellular communication systems as described in the background. It should be noted however, that other types of cellular systems can make use of the invention and the description is to be considered exemplary. It should further be noted that the term GSM is hereinafter used to refer to both circuit and packet switched modes, both with GMSK as well as 8PSK modulation (although packet switched GPRS is used as the primary example in the description).

In a GSM communication system, physical channels on which communication can occur are divided into timeslots on a radio frequency carrier. Each carrier frequency is divided into eight timeslots, or eight physical channels. Eight consecutive timeslots form a GSM frame. The timeslots are labeled TS0–TS7, referring to both up and downlink timeslots. Designators DL0–DL7 are used to refer specifically to downlink timeslots, and designators UL0–UL7 are used to refer specifically to uplink timeslots.

Four consecutive GSM frames form one block on each timeslot, TS0–TS7. There are different types of repetition cycles in the frame structure in GSM and EDGE Compact. One such repetition is the 52 multiframe, containing 52 consecutive GSM frames. This is the repetition cycle for many of the control channels in GSM and EDGE Compact, e.g., broadcast channels and common control channels but also traffic channels for user data. The 52 multiframe structure is used in GSM on all timeslots where traffic channels can be allocated. In EDGE Compact, it is always used.

The 52 multiframe also includes, apart from 12 blocks (i.e., 12*4=48 GSM frames) for traffic or control, 2 idle GSM frames and 2 GSM frames used for Packet Timing Advance Control Channel Signalling (PTCCH), for a total of 4*12+2+2=52 GSM frames. The GSM frame structure and block allocation of logical channels is further described in ETSI TS 100 908 v.6.2.0 Digital Cellular Communication System (Phase 2+); "Multiplexing and multiple access on the radio path" (GSM 05.02 version 6.2.0 Release 1997), hereby incorporated by reference.

Figure 1:
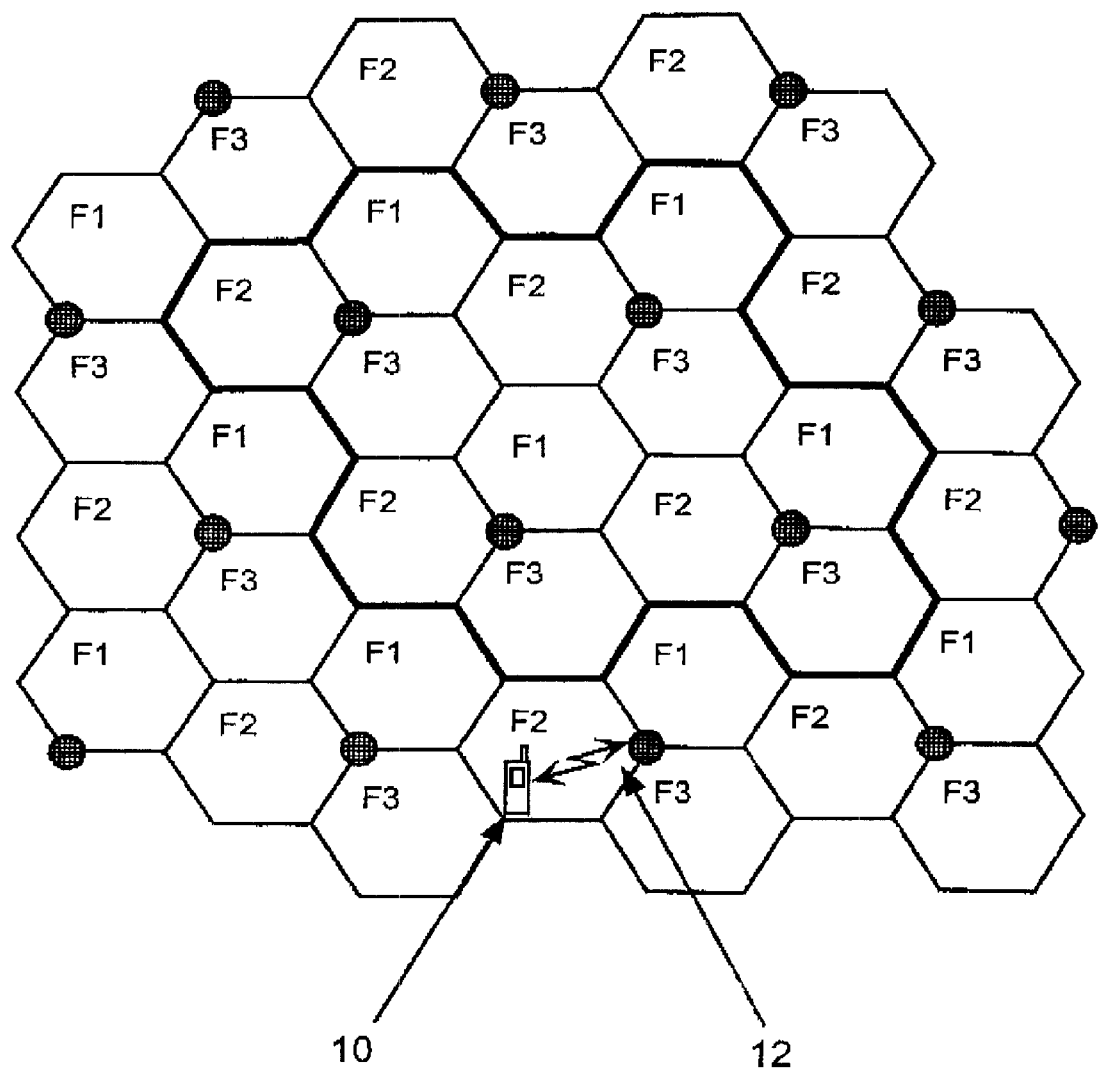
FIG. 1 illustrates a cellular pattern of a 1/3 frequency reuse.

FIG. 1 illustrates a typical 1/3 reuse pattern. Communication between an exemplary mobile 10 and an exemplary base station 12 is possible in each cell, by allocating a frequency and a timeslot to a certain connection. The base stations can be situated in the center of a cell, in which case the antenna is transmitting in all directions. Alternatively, base station sites can serve, e.g., 3 different cells, as in the figure, in which case sector antennas are used.

A 1/3 reuse is a possible reuse pattern for data traffic. However, for control information or circuit switched communication, e.g., voice, a higher reuse is necessary.

Figure 2:
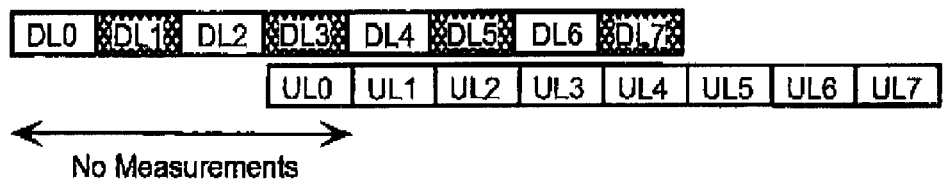
FIG. 2 illustrates an exemplary timeslot structure for up and downlink allocation according to the GSM specification.

The timeslot structure in GSM and EDGE Compact, for uplink and downlink communication is illustrated in FIG. 2. Each timeslot is defined for both uplink and downlink transmissions, UL0–UL7 and DL0–DL7 respectively. Uplink transmissions occur in a different frequency region than downlink transmissions, but the timeslot structure is the same. In FIG. 2 is illustrated a time shift of a duration corresponding to three time slots between uplink and downlink. This time shift is introduced such that mobiles do not have to perform both receive (downlink) and transmit (uplink) operations simultaneously.

Figure 3:
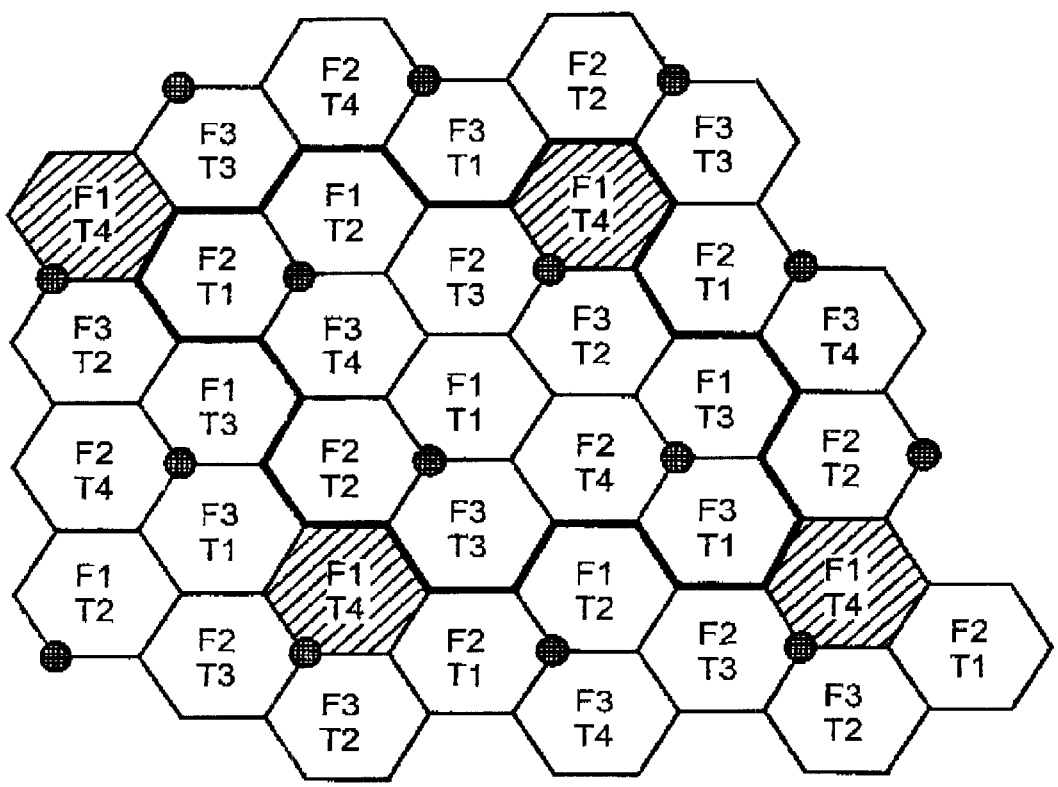
FIG. 3 illustrates a cellular pattern of a 1/3 frequency reuse combined with a 4x time reuse, creating an effective 4/12 time-frequency reuse.

The introduction of an EDGE Compact System is based on the possibility of initial deployment of a packet data system on only three carriers. These carriers carry both data traffic and packet associated and common control signalling. A 1/3 frequency reuse pattern forms the cell structure for the EDGE carrier. The base stations are time synchronized. This makes it possible to allocate physical channels for, e.g., Packet Common Control Channels (PCCCH) and Packet Broadcast Control Channels (PBCCH) in a way to prevent simultaneous use of the same timeslots for control channels in neighbor site base stations that are using the same control channel frequency. This is illustrated in FIG. 3. In FIG. 3, a frequency repetition pattern f1–f2–f3 is illustrated together with an overlaid time group pattern t1–t2–t3–t4, where each time group identifies groups of base stations using different timeslot for control channel transmissions on the same frequency. This forms an effective 4/12 reuse for control channel transmissions.

Figure 4:
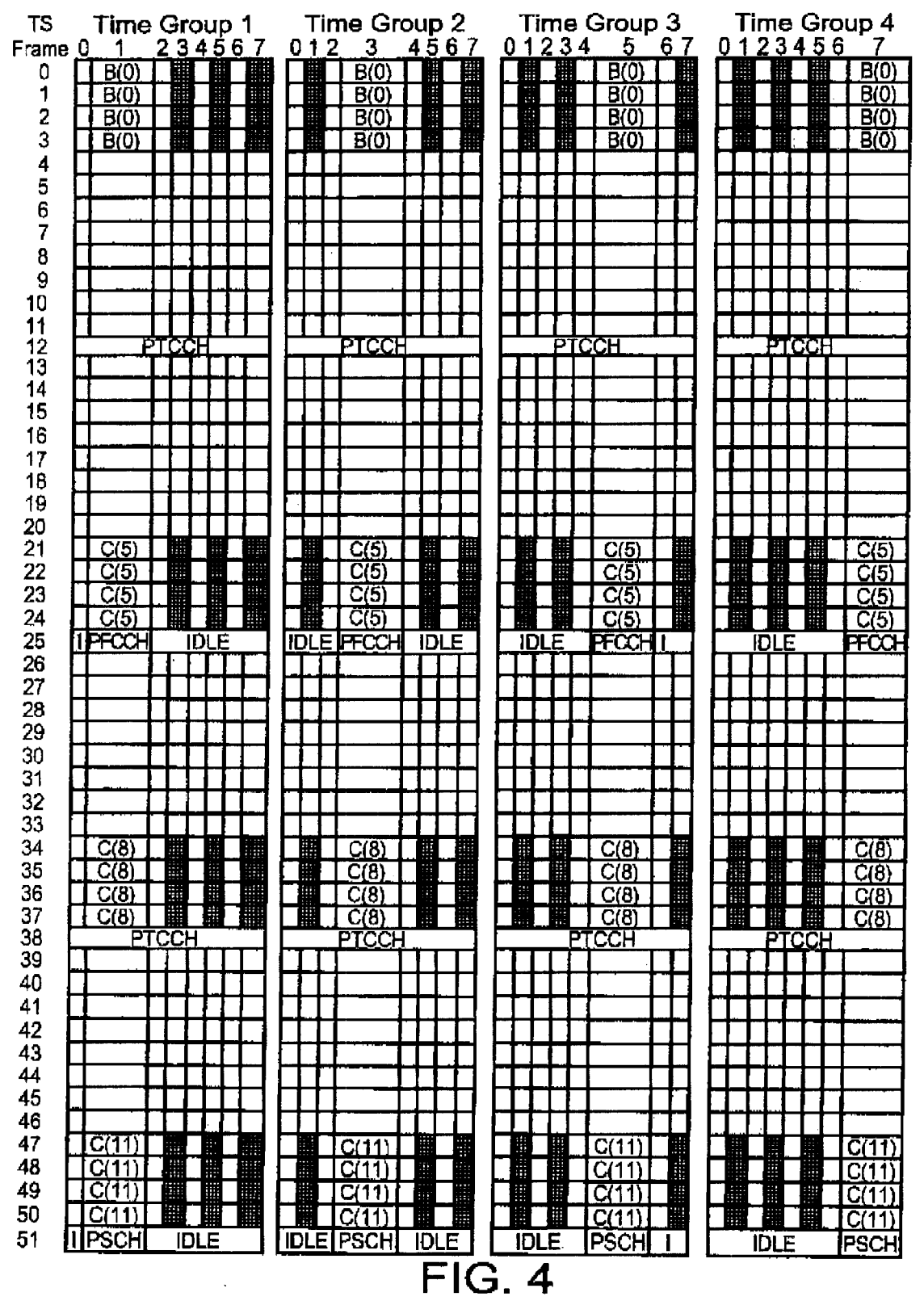

FIG. 4 depicts an exemplary allocation of control channels for an EDGE Compact System. Base stations are allocated certain frequencies for control channels. FIG. 4, illustrates, for one such frequency, that a certain number of blocks on certain timeslots can be allocated for control channel transmission, whereas other blocks on the same timeslot can be used for traffic. There is flexibility in the number of control blocks to allocate. In FIG. 4, one broadcast information transmission is allocated in the first block, in GSM frames 0–3, and three common control channel blocks are allocated in blocks 5, 8 and 11 on GSM frames, 21–24, 34–37 and 47–50, respectively. The other periods on the timeslots used for control can be used for additional control channel blocks or packet data traffic channels.

In FIG. 4, a base station belonging to time group 1 can transmit control information on TD1, physical channel timeslot 1. A base station belonging to time group 2 can transmit control information on TS3, etc. Additionally, base stations in time group 1 will not transmit at all when base stations in other time groups transmit control information. This is indicated in FIG. 4 by shading of some of the blocks, e.g., TS 3 and TS5 and TS7 in block B0 in time group 1. (It should be noted that the terminology TS# (timeslot #) is used when both uplink,UL and downlink, DL, timeslots are considered).

In GSM frame 25, a frequency correction burst is included for each time group, and in GSM frame 51 a synchronization burst for each time group is included. These bursts enable mobiles to find the control channel and identify the current phase in the GSM frame repetition pattern.

Neighbor cell measurements in a time synchronized system with discontinuous control channel carriers, such as EDGE Compact, is not as straightforward as it is in systems with a continuous control channel carrier, e.g., present GSM systems. The measurements must be made on the right frequency and on exactly the right timeslot, since control channels are not allocated to transmit during several consecutive timeslots. A mobile can thus only measure on neighbors during one specific timeslot and additionally during certain blocks that are allocated for control channel transmissions.

One timeslot is approximately 0.577 ms long and thus, it puts high requirements on measurement accuracy on the mobiles to ensure that a mobile actually opens its measurement window on a control timeslot and not on a neighboring traffic timeslot.

Figure 5A:
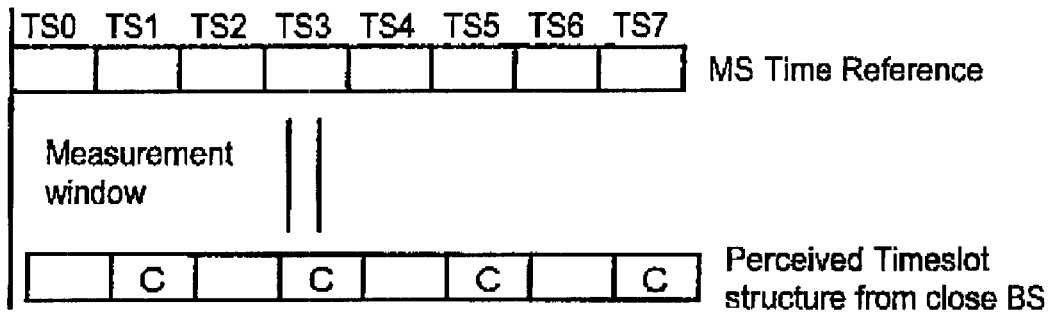
FIG. 5A illustrates a mobile measurement window that is opened to perform measurement on a geographically close neighbor base station transmission.
Figure 5B:
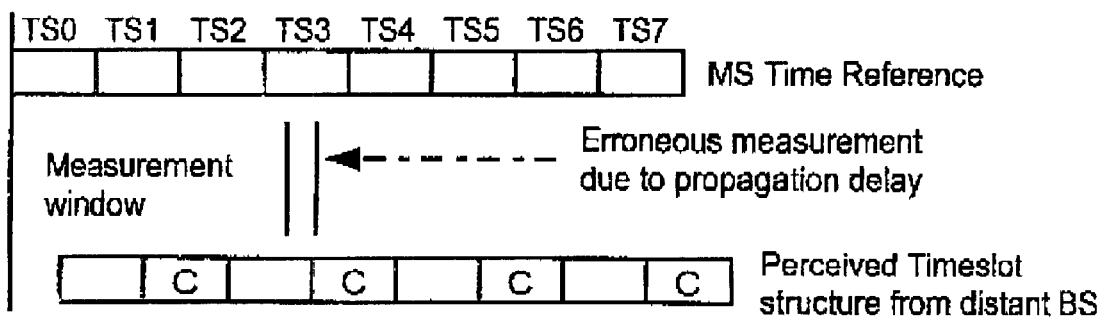
FIG. 5B illustrates a mobile measurement window that is opened to perform measurement on a geographically distant neighbor base station transmission.

This problem is illustrated in FIGS. 5A and 5B. FIGS. 5A and 5B illustrate an exemplary situation with a mobile timeslot reference according to the timing alignment as received from a serving base station. The timing alignment takes into consideration propagation delays from the serving base station to the mobile base station. However this timing alignment is probably not valid for neighbor base stations, since they are probably not equally distant from the mobile station as compared to the serving base station.

A mobile is not explicitly informed of such a time difference. Some propagation delay difference between neighbor and serving base stations to the mobile will then result in mobiles perceiving a non-aligned timeslot structure from neighbor base stations. Dependent on the propagation delay difference, this non-alignment can be more or less severe.

FIG. 5A illustrates that a measurement window is defined, that is significantly shorter in duration than a timeslot. In FIG. 5A, the case when a neighbor base station is only slightly more distant than the serving base station is considered. Such a measurement window, opened in, e.g., the middle of the timeslot structure as known to the mobile from its serving base station, will then be able to cope with the additional delay from the neighbor base station. The propagation delay difference is not large enough for the measurement window to fall outside the duration of the delayed timeslot allocated for control in a neighbor base station, e.g., TS3. However, as depicted in FIG. 5B, if there is a large enough propagation delay between a serving and a neighbor base station, the mobile station will still believe that it measures on the correct timeslot, when in fact the timeslot has not arrived to the mobile station at the time the measurement window is opened.

Figure 6A:
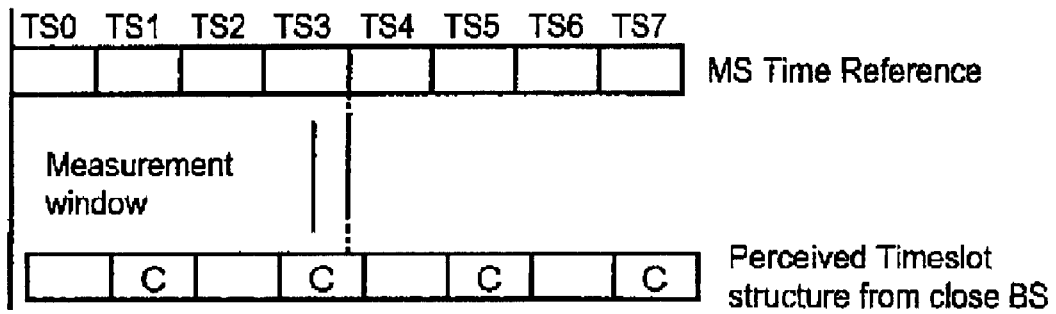
FIG. 6A illustrates a mobile measurement window that is opened at an appropriate time to perform measurement on a geographically close neighbor base station transmission according to one aspect of the present invention.
Figure 6B:
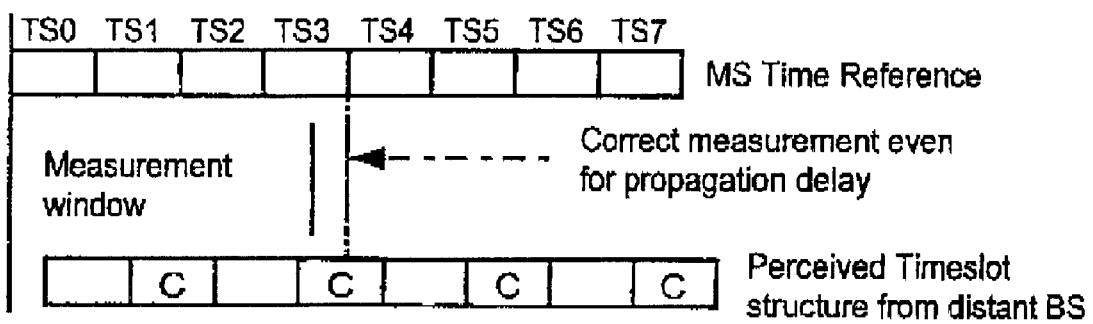
FIG. 6B illustrates a mobile measurement window that is opened at an appropriate time to perform measurement on a geographically distant neighbor base station transmission according to one aspect of the present invention.

FIGS. 6A and 6B illustrate an exemplary situation with a mobile timeslot reference according to the timing alignment as received from a serving base station according to one embodiment of the present invention.

In FIG. 6A, the measurement window is opened very late during what a mobile believes is the correct timeslot. This means that measurements from geographically close neighbor base stations will be managed, since they will not have a propagation delay that is much different than the propagation delay between the mobile and the serving base station.

FIG. 6B illustrates that opening the measurement window very late in what a mobile believes is the correct timeslot, will also mean that the measurement window will still be within this correct timeslot, even for transmissions originated from distant neighbor base stations. The propagation delay difference will not be large enough to leave the mobile measuring in the preceding timeslot, which for EDGE Compact can be a power controlled timeslot allocated for traffic.

The measurement window size is closely related to the propagation distance a mobile can handle while still measuring within a correct control channel timeslot. A GSM timeslot is 156.25 modulation symbols long, including a guard period of 8.25 modulation symbols. The measurements should however be performed within the time at which the power is at the set power for a certain timeslot, i.e., without guard periods or upramping and downramping times. The downramping time is the time at which the power shifts from a set output power to a power output close or equal to zero. There are at least 142 symbols within each timeslot that are transmitted with the correct power, where a mobile should make measurements (where correct power refers to the output power set for that timeslot, and not affected by, e.g., downramping periods).

In an exemplary calculation, a measurement window of 80 modulation symbols duration is considered. The difference between the size of the measurement window and the timeslot duration is then 142−80=62 modulation symbols. Each modulation symbol is $48/13 \cdot 10^{-6}$ seconds long. The 62 modulation symbols then correspond to a propagation distance of ≈69 km. This means that, with the technique described in connection to FIGS. 6A and 6B, a mobile can manage a propagation delay difference of ≈69 km between its serving base station and a neighbor base station and still be able to measure in the correct timeslot. This can be achieved without having any knowledge of the actual propagation difference.

Thus, the calculation of when a mobile actually should open its measurement window to make signal strength measurements on neighbor base stations, is based on the knowledge of the propagation delay to the serving base station and the timeslot used for control channel transmission in the neighbor base station. Of course, the above is only an example, and other measurement window sizes can be used.

In another aspect of the present invention, the measurement strategy is further combined with estimates of the propagation difference between the serving base station and a neighbor base station.

Figure 8:
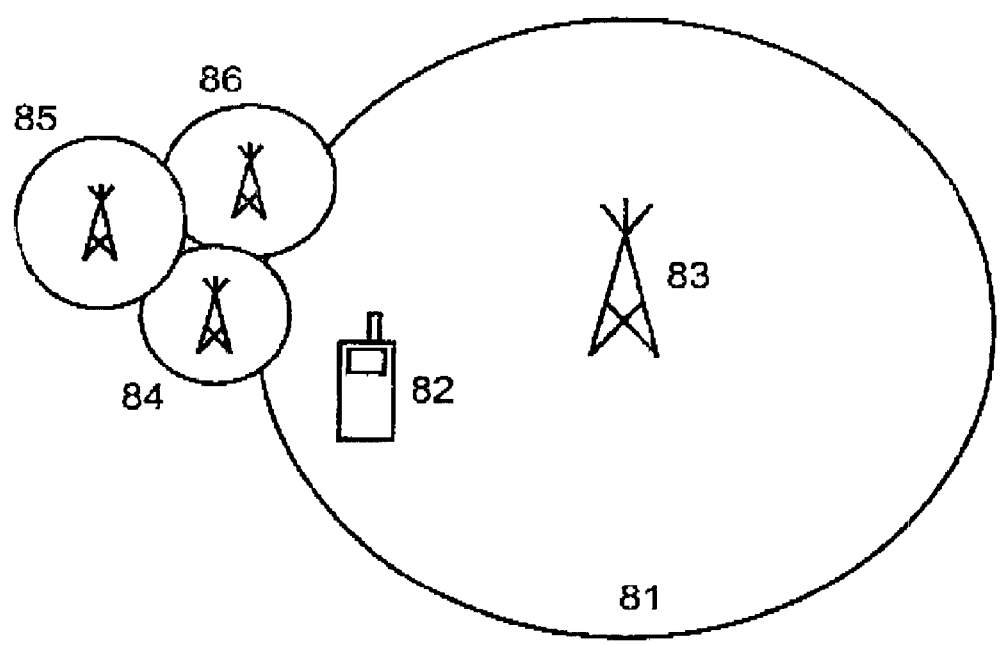
FIG. 8 illustrates a cell pattern with cells of significantly different cell sizes.

It should be noted that the strategy described in connection to FIGS. 6A and 6B works well for most cases where neighbor cell measurements should be performed. However, there are situations when the neighbor base stations are actually closer to the mobile than the serving base station. This is illustrated in FIG. 8, where a number of smaller cells 84, 85, 86 are neighbors to a larger cell 81. This situation can occur on the borders of a "hot spot" (i.e., a location where traffic is much more intense than it is in its surroundings).

Figure 9:
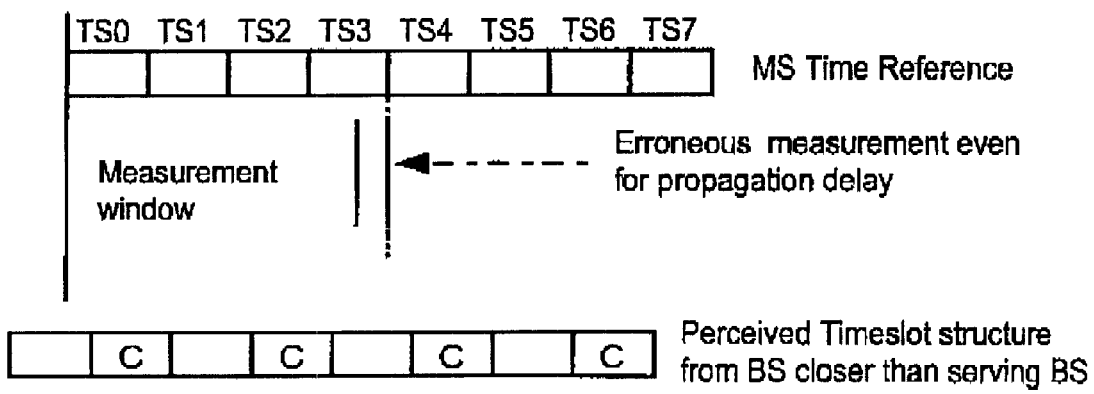
FIG. 9 illustrates a measurement situation in a cell pattern with significantly different cell sizes.

In a hot spot, cell planning is done with smaller cells and lower constant output power on the control channel timeslots. As shown, a mobile 82 can then be closer to a neighbor base station in a smaller cell than it is to the base station 83 in the serving cell. If neighbor cell measurements are performed such that a measurement window is opened late in a timeslot used for control according to the timeslot reference from the base station 83, then a control timeslot from, e.g., a base station in a smaller cell will have already occurred. This is illustrated in FIG. 9.

According to another embodiment of the invention, this and other situations are taken into account by estimating the real time difference due to propagation delay between a serving base station and a neighbor base station, and take this estimate into account in the mobile, in the functionality that controls the measurement window. Such estimates are possible to perform in the mobile station itself and do not have to involve the base stations.

In addition to making signal strength measurements on neighbor base stations, a mobile also decodes a base station identity. This is done by decoding the synchronization burst. For example, in EDGE Compact, the synchronization burst is transmitted in the same timeslot as other control channels, in GSM frame 51. To be able to decode a synchronization burst, a mobile listens for a longer time than one timeslot, since it is not aware of the propagation delay difference between its serving base station and a neighbor base station. However, after detection and decoding of the synchronization burst, it is possible to make an estimate of the time alignment difference between the neighbor cell base station transmitting the synchronization burst and the serving base station (e.g., by comparing the time difference between arrivals of the synchronization bursts from the neighboring and serving base stations). This time alignment difference can then be used to adjust the signal strength measurement window position for signal strength measurements on that particular base station. With this information, the mobile station is able to find an optimal position in a timeslot for opening the measurement window and making signal strength measurements.

Figure 10:
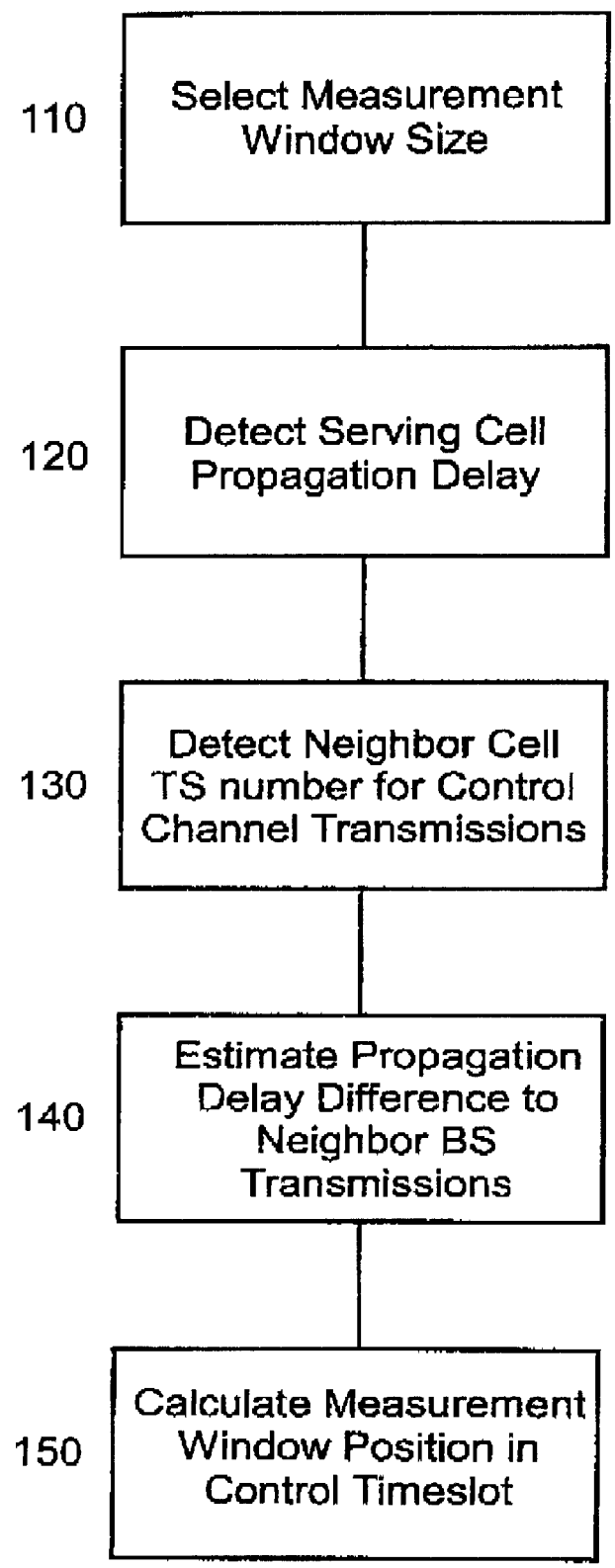
FIG. 10 illustrates a flow chart of an exemplary measurement algorithm according to the invention.

This embodiment of the invention is illustrated in FIG. 10, depicting a flow diagram of an exemplary measurement algorithm according to the invention. In step 110, a measurement window size is selected. This measurement window size is typically significantly shorter in duration than a timeslot duration. In step 120, the base station propagation delay of the serving cell is estimated. This is accomplished by noting the downlink timeslot arrivals from the serving base station. In step 130, information as to which timeslot a neighbor cell is transmitting control information is added. In step 140, an estimate of the propagation delay difference between serving and neighbor base stations is generated, for example by using the above described method of detecting a synchronization burst. Finally, with the information gathered in steps 110–140, an optimal position of a measurement window is calculated in step 150.

Figure 11:
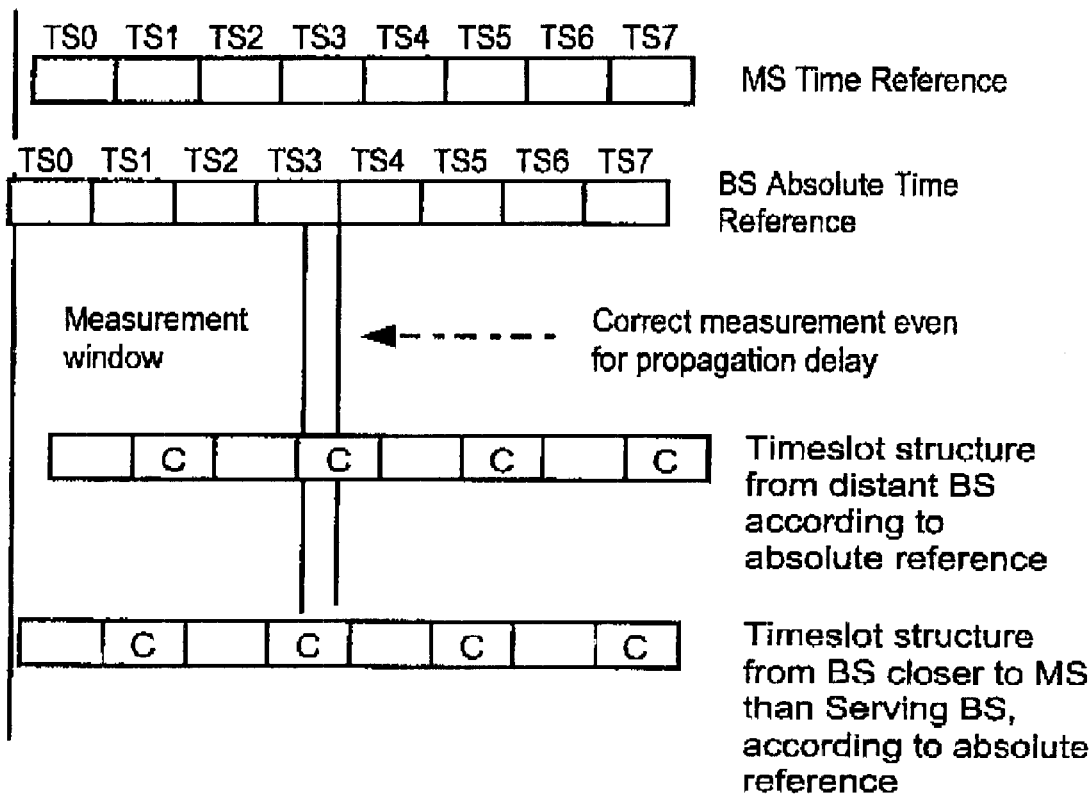
FIG. 11 illustrates opening a measurement window late in a timeslot according to an exemplary embodiment of the present invention.

In yet another aspect of the present invention, it is possible for a mobile to make an estimate of an absolute time reference, i.e., a time reference as transmitted from the serving base station. This can be done by noting the timing alignment indication received from the serving base station. This then corresponds to a difference between a mobile's perceived timeslot alignment and the timeslot alignment in the base station, i.e., the absolute time reference. Once the base station's absolute timeslot reference has been determined, the absolute timeslot reference is also inherently known for all other base stations, since all the base stations are synchronized. Thus, a mobile can open the measurement window late in the timeslot corresponding to a control channel transmission from a neighbor base station according to this absolute time reference. Since nothing is transmitted in a timeslot before it starts in the absolute timeslot reference, the situation in which the measurement window is opened too late will not occur. This is illustrated in FIG. 11, for both base stations at larger distances away than the serving base station, as well as base stations closer to the mobile than the serving base station. It should be noted that neighbor cell measurements include measurements on cells defined in a neighbor cell list, and these cells are not necessarily geographical neighbors.

Note, also, that it is possible for a serving base station to send propagation delay/timeslot alignment information to mobile stations it is serving (e.g., in systems where base stations are aware of the geographic locations of neighboring base stations). If so, then mobile stations can use such information directly in making properly timed control measurements, without first having to compute appropriate measurement windows for neighboring base stations.

Figure 7:
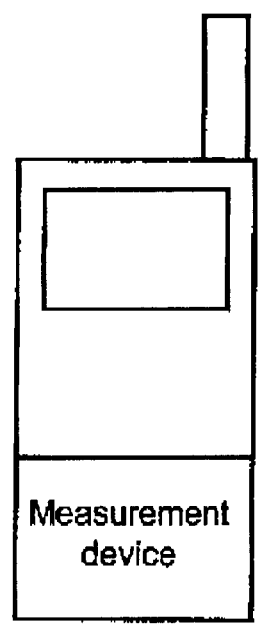
FIG. 7 illustrates a mobile station that performs measurements according to one embodiment of the present invention.

According to another aspect of the present invention, a mobile station is equipped with a measurement device that performs measurements according to the methods described above. A mobile station with such a measurement device is illustrated in FIG. 7. This measurement device can be combined with other functionality in the mobile, such as other receiver functionality. The measurement device is responsible for opening and closing a measurement window as late as possible during the time in a timeslot when modulation symbols are transmitted with a power not affected by, e.g., downramping. Further, the measurement device also performs the calculation of the position to open the measurement window, and the duration of the measurement window.

Although the present invention is described with examples from a packet switched communication system compliant to the GPRS/GSM, an specifically the EDGE Compact system, it will be appreciated that the solutions presented can be equally well applied to any other packet switched data communication system. For example, the measurement strategy can be applied in different variants of the EDGE Compact system, also supporting circuit switched communication. Such a mode of EDGE Compact is described, for example, in U.S. patent application Ser. No. 09/472,882, entitled Methods and Apparatus for performing Slot Hopping of Logical Control Channels in Wireless Communications Systems and filed on even date herewith, which is incorporated herein in its entirety by reference. The specific embodiments should therefore be considered exemplary rather than limiting the scope of the invention. The invention should rather be defined by the following claims.

What is claimed is:

1. A base station site synchronized cellular communications system, wherein downlink control channel transmission are allocated on discontinuous control channel carrier, comprising:

a first base station;

a second, neighboring base station; and a mobile station being served by the first base station, the mobile station including a measurement unit adapted to make measurements of control channel signaling of the neighboring base station, wherein the measurement unit:

identifies a time slot during which the neighboring base station transmits control channel signaling, defines a duration of a control channel signaling measurement window to be less than a duration of the identified timeslot, aligns the control channel signaling measurement window such that the measurements of the control channel signaling from the neighboring base station actually arrives at the measurement unit of the mobile station, and adjusts the position of the measurement window based on a determination of an absolute time reference from the first base station.

2. The system of claim 1, wherein the serving base station transmits information regarding the relative geographic positions of the serving and neighboring base stations to the mobile station, and wherein the measurement unit adjusts the position of the measurement window based on the transmitted information.

3. The system of claim 1, wherein the measurement unit determines a difference between a propagation delay from the serving base station and a propagation delay from the neighboring base station, and adjusts the position of the measurement window based on the determined difference.

4. The system of claim 3, wherein the mobile station determines the difference between propagation delays by reading a synchronization burst transmittal by the neighboring base station.

5. The system of claim 1, wherein the measurement unit determines a position of a timeslot of the serving base station which corresponds with the identified timeslot of the neighboring base station, and positions the measurement window late in the timeslot of the serving base station.

6. In a base station site synchronized cellular communications system, wherein downlink control channel transmissions are allocated on discontinuous control channel carriers, and wherein a mobile station is served by a first base station, a method for enabling the mobile station to make signal strength measurements on control channel transmissions from a second, neighboring base station, comprising the steps of:

identifying a time slot during which the neighboring base station transmits control channel signaling;

defining a duration of a measurement window in which a measuring unit of the mobile station makes measurements of the neighboring base station control channel signaling, the duration of the measurement window being less than a duration of the identified timeslot; and aligning the measurement window such that the measurements are made when the control channel signaling from the neighboring base station actually arrives at the measuring unit of the mobile station, wherein the position of the measurement window is adjusted based on a determination of an absolute time reference from the first base station.

7. The method of claim 6, wherein the step of aligning the measurement window includes the steps of:

transmitting information regarding the relative geographic positions of the serving and neighboring base stations from the serving base station to the mobile station; and adjusting the position of the measurement window based on the transmitted information.

8. The method of claim 6, wherein the step of aligning the measurement window includes the steps of:

determining a difference between a propagation delay from the serving base station and a propagation delay from the neighboring base station; and adjusting the position of the measurement window based on the determined difference.

9. The method of claim 8, wherein the mobile station determines the difference between propagation delays by reading a synchronization burst transmitted by the neighboring base station.

10. The method of claim 6, wherein the step of aligning the measurement window includes the steps of:

determining the position of a timeslot of the serving base station which corresponds with the identified timeslot of the neighboring base station; and positioning the measurement window late in the timeslot of the serving base station.

\* \* \* \* \*